US007656429B2

(12) United States Patent
Larson (10) Patent No.: US 7,656,429 B2
(45) Date of Patent: Feb. 2, 2010

(54) DIGITAL CAMERA AND METHOD FOR IN CREATING STILL PANORAMAS AND COMPOSITE PHOTOGRAPHS

(75) Inventor: Brad R. Larson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 10/772,165

(22) Filed: Feb. 4, 2004

(65) Prior Publication Data

US 2005/0168594 A1 Aug. 4, 2005

(51) Int. Cl.
*H04N 5/228* (2006.01)
*H04N 7/00* (2006.01)

(52) U.S. Cl. .................. 348/208.14; 348/36; 348/239; 348/333.02

(58) Field of Classification Search ............ 348/36, 348/39, 333.02, 333.03, 333.12, 346, 208.14; 345/629; 382/284
See application file for complete search history.

(56) References Cited

U.S. PATENT DOCUMENTS

| | | | | |
|---|---|---|---|---|
| 5,557,358 | A * | 9/1996 | Mukai et al. ............ 396/296 |
| 5,808,678 | A * | 9/1998 | Sakaegi ................ 348/333.03 |
| 6,008,844 | A * | 12/1999 | Tsuda et al. ........... 348/333.02 |
| 6,064,399 | A | 5/2000 | Teo |
| 6,262,746 | B1 * | 7/2001 | Collins ...................... 345/629 |
| 6,304,284 | B1 * | 10/2001 | Dunton et al. ............... 348/36 |
| 6,323,858 | B1 | 11/2001 | Gilbert et al. |
| 6,411,742 | B1 | 6/2002 | Peterson |
| 6,545,708 | B1 * | 4/2003 | Tamayama et al. ....... 348/211.8 |
| 6,657,667 | B1 * | 12/2003 | Anderson .............. 348/333.12 |
| 6,806,906 | B1 * | 10/2004 | Soga et al. ............ 348/333.03 |
| 6,813,040 | B1 * | 11/2004 | Uchino et al. ................ 358/1.9 |
| 6,867,801 | B1 * | 3/2005 | Akasawa et al. ......... 348/222.1 |
| 7,057,658 | B1 * | 6/2006 | Shioji et al. ............ 348/333.12 |
| 7,292,261 | B1 * | 11/2007 | Teo ............................. 348/36 |
| 7,327,890 | B2 * | 2/2008 | Fredlund .................... 382/218 |
| 7,349,020 | B2 * | 3/2008 | Stavely et al. .......... 348/333.02 |
| 2004/0189849 | A1 * | 9/2004 | Hofer .................... 348/333.03 |

FOREIGN PATENT DOCUMENTS

| | | |
|---|---|---|
| JP | 07-303250 | 11/1995 |
| JP | 10-177637 | 6/1998 |
| JP | 10-304227 | 11/1998 |
| JP | 11-275393 | 10/1999 |
| JP | 2000-050136 | 2/2000 |
| JP | 2000-299804 | 10/2000 |
| JP | 2001-078170 | 3/2001 |
| JP | 2001-169151 | 6/2001 |
| JP | 2003-333390 | 11/2003 |

\* cited by examiner

*Primary Examiner*—Lin Ye
*Assistant Examiner*—Carramah J Quiett (57) ABSTRACT

Digital cameras and methods that help a user accurately align sequential photographs to create large panoramas and composite photographs derived from a sequence of smaller photographs. This effectively creates a higher resolution, or larger, photograph from a zigzag series of photographs using a low resolution camera. An algorithm running on the camera guides a user through the image-taking procedure, allowing him or her to select if a panoramic or composite photograph is to be taken, and optionally the number of images (width and height) needed to create the final image. The algorithm displays indicia, such as marks or a shadow (transparent) image, that are overlaid and moved over the live image during the image-taking process to help align the subsequent image to be taken with the previously recorded image.

21 Claims, 6 Drawing Sheets

FIRST IMAGE TAKEN

Fig. 3b

SEMI-TRANSPARENT OVERLAY OF THE RIGHT PORTION OF THE FIRST (PREVIOUS) IMAGE

CAMERA DISPLAY BOUNDARY

LIVE IMAGE IN THE CAMERA DISPLAY

CAMERA DISPLAY SHOWING THE PANORAMIC ASSIST ON THE LEFT SIDE

Fig. 3c
DESIRED PANORAMIC IMAGE

Fig. 4a

A USER TAKES A PHOTO

SOLID GUIDE LINES ARE DISPLAYED

DOTTED LINES (NOT VISIBLE) INDICATE REGIONS WHERE THE ALGORITHM SEARCHES FOR AN EDGE OR OBJECT TO TRACK, AND TRIES TO IDENTIFY ONE OR MORE ON EACH SIDE OF THE PHOTO

Fig. 4b

ARROWS (NOT VISIBLE TO THE USER) INDICATE POTENTIALLY USEFUL EDGES FOR TRACKING

Fig. 4c

GUIDELINES ARE MOVED WITH THE LIVE IMAGE AS THE USER MOVES THE CAMERA TO SET UP FOR THE NEXT PHOTO

ARROWS INDICATE THE LOCATIONS THAT ARE TRACKED BY THE ALGORITHM

Fig. 4d

THE USER PLACES THE OVERLAPPING REGION CORRECTLY AT THE EDGE BY PUTTING THE LINES ALONG THE CORRECT SIDE

Fig. 5a

A USER TAKES A PHOTO

THE USER PRESSES "PANORAMA/COMPOSITE"

THE IMAGE CHANGES TO TRANSPARRENT OVERLAY WITH THE LIVE IMAGE ALSO DISPLAYED BENEATH IT

THE USER PRESSES "⇐"

INITIAL PHOTO

Fig. 5b

TRANSPARENT IMAGE "SLIDES" OVER THE THE USER-INDICATED SIDE

TRANSPARENT OVERLAY

LIVE DISPLAY UNDERNEATH

Fig. 5c

THE USER MOVES THE CAMERA TO ALIGN THE LIVE IMAGE WITH THE CORRECTLY-POSITIONED TRANSPARENT OVERLAY FOR OPTIMAL RESULTS

THE CAMERA CAN ALSO STORE INFORMATION RELATED TO THE SEQUENCE OF THE PHOTOS AND THEIR PPOSITIONS RELATIVE TO ONE ANOTHER

OVERLAY FINAL POSITION

SUBSEQUENT PHOTO

DIGITAL CAMERA AND METHOD FOR IN CREATING STILL PANORAMAS AND COMPOSITE PHOTOGRAPHS

TECHNICAL FIELD

The present invention relates generally to digital cameras and methods that produce panorama (composite) images.

BACKGROUND

When digital camera users take photographs that will eventually make up a panorama, they can have the most effective results if the photographs are taken with an optimal amount of overlap and reasonably good alignment to begin with. Current generation cameras attempt to help the user with this, but they are only minimally effective.

For panoramas, if the sequence of photographs are not aligned well along the horizon, the final panorama is limited in the vertical direction by the top of the lowest photograph of the series that is taken, and the bottom of the highest photograph that is taken. Thus, the best outcome results when each photo is aligned well with the others horizontally.

Any time that stitching is employed between photographs, the best matching and results occur when there is enough overlap between the photographs to accurately match features and also to avoid image distortion that can occur at the edges of the lens. This optimal amount of overlap varies from camera to camera, but manufacturers can specify the amount for each.

Alignment across sequential photos, side-to-side, is not too bad (unassisted) because every photograph only has one side overlap that the user needs to remember. However, to create composite photographs or more complex panoramas (360 degrees or perhaps with two passes, with one vertically higher than the other), each photograph may end up with multiple overlapping images. This is much harder to align well, even using a tripod.

The present inventor believes that the process of taking composite photographs does not have any good support in current generation cameras. There needs to be some guidance to help the user take a zigzag series of photographs in the best order and with enough overlap on two sides to make image stitching successful.

The only support for panoramas in digital cameras that the present inventor is aware of are lines that the camera can display on a display screen. The user is supposed to mentally keep track of what part of the image was at the line on one photograph, then move that part of the image over to the line on the opposite side. The camera does not do anything specific, the user has to remember what was there when the picture was taken. As mentioned before, this is reasonable for a simple side-to-side panorama, however, it does not work for more complex compositions.

Analog cameras make a panorama effect by cropping the top and bottom of the image and constraining the user to use a wide angle mode. However, the entire image is still placed on only one film exposure. This is a very limited and awkward method of creating panoramas.

U.S. Pat. No. 6,411,742 issued to Peterson, entitled "Merging images to form a panoramic image" discloses "a method of blending images of segments of a view. The method includes determining the position of a second segment of the view represented by a second image relative to a first segment of the view represented by a first image, dividing the second image into a first section and a second section, based on the determined positions, drawing the first image on a canvas, and drawing the first section of the second image on the canvas at the determined position so that a portion of the first section masks out a portion of the first image." [see Summary]

U.S. Pat. No. 6,064,399 issued to Teo, entitled "Method and system for panel alignment in panoramas" discloses a "method and system for constructing a panoramic image including the steps of applying panoramic curvature to at least one image, thereby to create a panoramic background embedding in the panoramic background an additional image having a geometry other than that of the panoramic curvature thereby to provide a composite panoramic image containing an embedded image corresponding to the additional image and whose geometry matches that of the panoramic background." [see Abstract]

U.S. Pat. No. 6,323,858 issued to Gilbert et al., entitled "System for digitally capturing and recording panoramic movies" discloses a "digital system for capturing and storing panoramic images using progressive scan (that is, non interlaced) technology. The system includes a digital image input device and an associated control computer. . . . The image input device has six lenses positioned on the six faces of a cube. While the image input system can have other lens configurations, the use of six lenses in a cubic configuration is optimal for a system that is used to capture a spherical panorama." [see Abstract]

SUMMARY OF THE INVENTION

The present invention provides for digital cameras and methods that help a user accurately align sequential photographs to create optimal panoramas and composite photographs that produce a large photograph derived from a sequence of smaller photographs. This effectively creates a higher resolution, or larger, photograph from a zigzag series of photographs using a low resolution camera.

An algorithm running on the camera guides a user through the image-taking procedure, allowing him or her to select if a panoramic or composite photograph is to be taken, and optionally the number of images (width and height) needed to create the final image. The algorithm displays indicia that are overlaid and moved over a live image during the image-taking process to help align the subsequent image to be taken with the previously recorded image. Alternatively, a transparent image is moved in an appropriate direction across the display to the location of the subsequent photograph that is to be taken, which is used to align and place the subsequent photograph relative to the preceding photograph.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which.

DETAILED DESCRIPTION

Figure 1A:
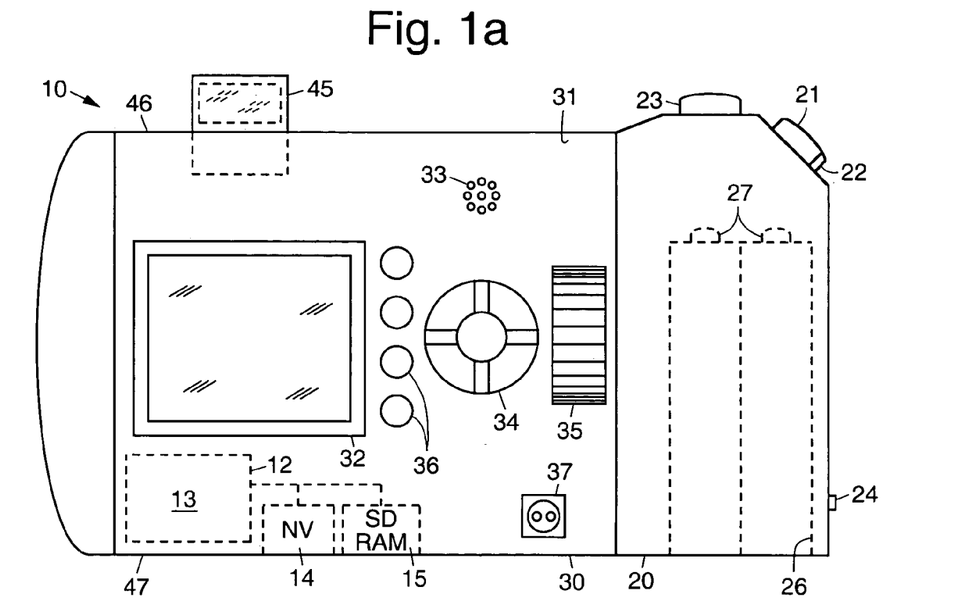
FIGS. 1a and 1b are rear and front views, respectively, of an exemplary digital camera in accordance with the principles of the present invention.
Figure 1B:
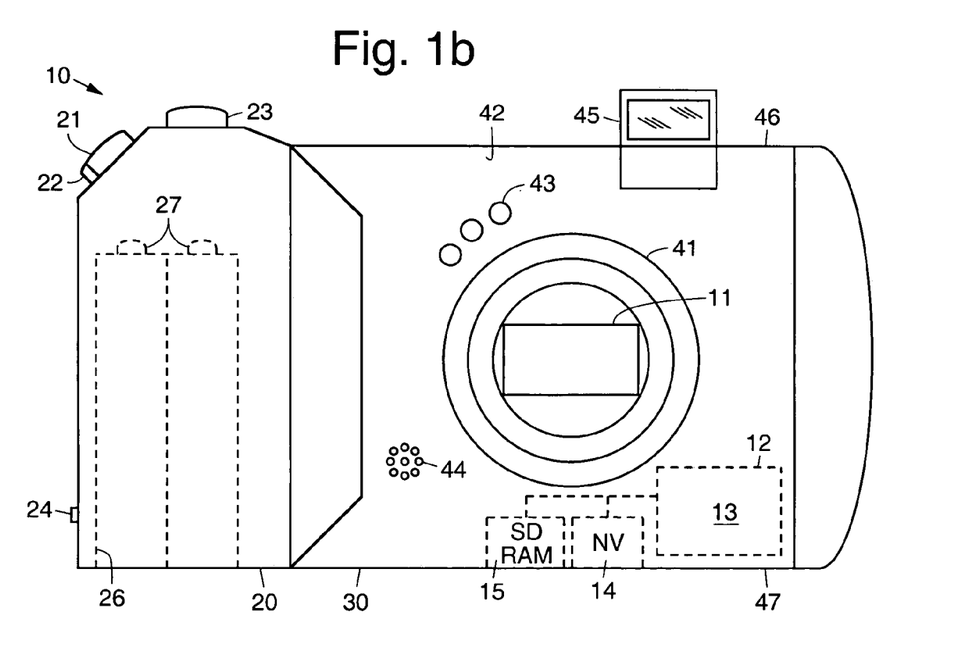

Referring to the drawing figures, FIGS. 1a and 1b are rear and front views, respectively, of an exemplary digital camera 10 that is designed to produce panorama (composite) images using the principles of the present invention. As is shown in FIGS. 1a and 1b, the exemplary digital camera 10 comprises a handgrip section 20 and a body section 30. The handgrip section 20 includes a power button 21 or switch 21 having a lock latch 22, a record button 23, a strap connection 24, and a battery compartment 26 for housing batteries 27. The batteries may be inserted into the battery compartment 26 through an opening adjacent a bottom surface 47 of the digital camera 10.

As is shown in FIG. 1a, a rear surface 31 of the body section 30 comprises a display 32 or viewfinder 32, such as a liquid crystal display (LCD) 32, for example, a rear microphone 33, a joystick pad 34, a zoom control dial 35, a plurality of buttons 36 for setting functions of the camera 10 and an output port 37 for downloading images to a computer, for example. As is shown in FIG. 1b, a zoom lens 41 extends from a front surface 42 of the digital camera 10. A metering element 43 and front microphone 44 are disposed on the front surface 42 of the digital camera 10. A pop-up flash unit 45 is disposed adjacent a top surface 46 of the digital camera 10.

An image sensor 11 is coupled to processing circuitry 12 (illustrated using dashed lines) that are housed within the body section 30, for example. An exemplary embodiment of the processing circuitry 12 comprises a microcontroller (µC) 12 or central processing unit (CPU) 12. The (µC 12 or CPU 12 is coupled to a nonvolatile (NV) storage device 14, and a high speed (volatile) storage device 15, such as synchronous dynamic random access memory (SDRAM) 15, for example.

The processing circuitry 12 (microcontroller (µC) 12 or CPU 12) in the digital camera 10, embodies a processing algorithm 13 (or alignment algorithm 13) in accordance with the principles of the present invention that accurately aligns sequential photographs to create optimal panoramas and composite photographs. This will be discussed in more detail with reference to FIGS. 2, 3a-3c, 4a-4d and 5a-5c.

Figure 2:
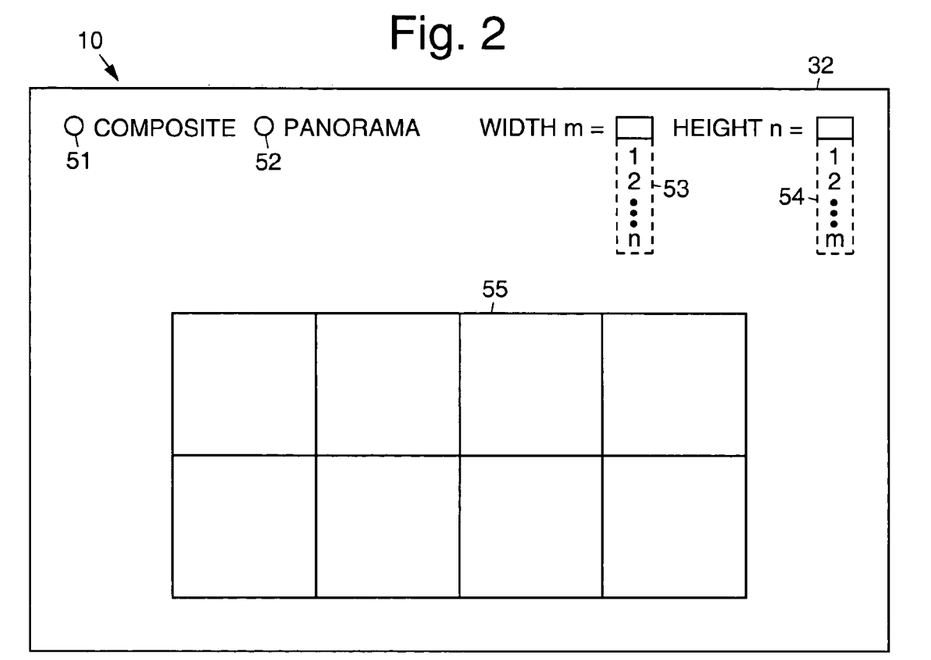
FIG. 2 illustrates an exemplary user interface that is displayed for use in producing panoramas and composite photographs.

Referring to FIG. 2, it illustrates an exemplary user interface that is displayed on the display 32 for use in producing panoramas and composite photographs. As is shown in FIG. 2a, the user can specify that he or she wants to create a composite photograph or panorama, such as by using selection buttons 51, 52 on the display 32. The user may indicate that the result should be n photographs wide and m photographs tall, such as by entering the width and height on the display 32, using pull-down menus 53, 54, for example. However, other types of menus 53, 54 may also be used, such as pop-up or sliding menus 53, 54, for example. Panoramas might have n>1 and m=1, composite photos have n>1 and m>1). A second aspect of the present invention discussed below may be used instead of having the user specify n and m.

In accordance with a first aspect of the present invention, the algorithm 13 running on the camera 10 may overlay indicia 55, such as a grid 55, for example, indicating the location of the first photograph to be taken relative to the m×n final image. The algorithm 13 directs the user to start at one corner of the final image, for example, the top left corner.

Figure 3A:
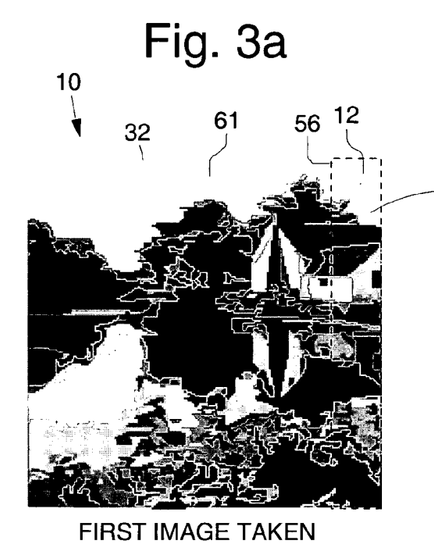
FIGS. 3a and 3b show a display screen of a digital camera illustrating an exemplary alignment technique in accordance with the principles of the present invention that helps a user to compose a panorama.
Figure 3B:
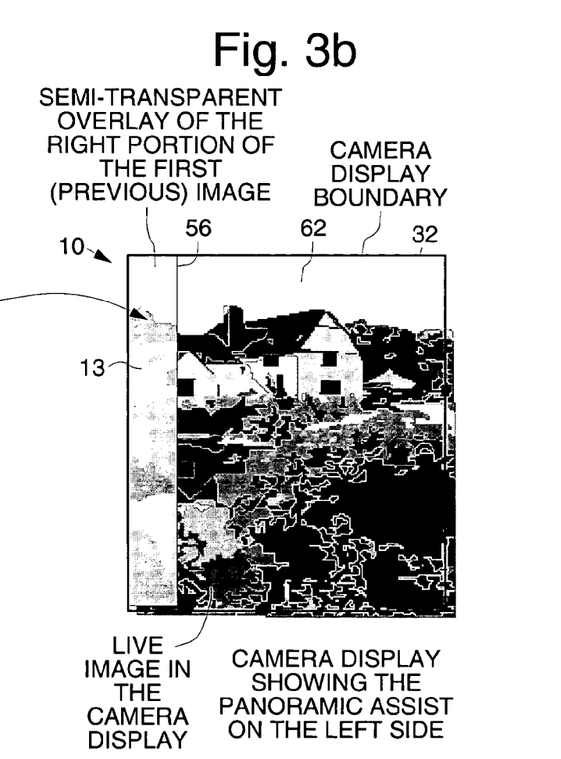
Figure 3C:
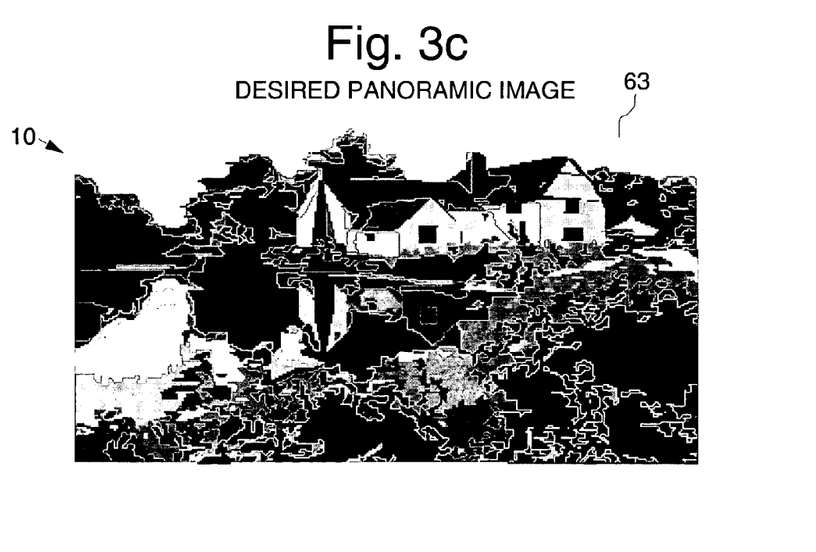
FIG. 3c illustrates a finished panorama constructed using the present invention.

The first feature takes place at this point. Referring to FIGS. 3a-3c, the user takes a first photograph 61 and the algorithm 13 overlays marks 56 (illustrated using dashed lines in FIG. 3a) on the displayed image where the ideal overlap would be for the next photographic image 62 (i.e., to the right), shown in FIG. 3b. Using video object tracking technology, for example, on the low-resolution displayed image 56, the initial marks are moved with the image as the camera 10 rotates or moves in order to keep them locked in the same place within the image as the camera 10 is panned (scanned or moved). It is to be understood that the present invention may be employed in situations where the camera 10 is panned from left-to-right, right-to-left, or in a vertical dimension. The desired panoramic image 63 is illustrated in FIG. 3c.

There are many ways to implement object tracking, but given the limited resources (CPU, memory, etc.) currently available in the digital camera 10, for this application a simple one works fairly well as will be described below. A first embodiment is illustrated with reference to FIGS. 4a-4d.

Figure 4A:
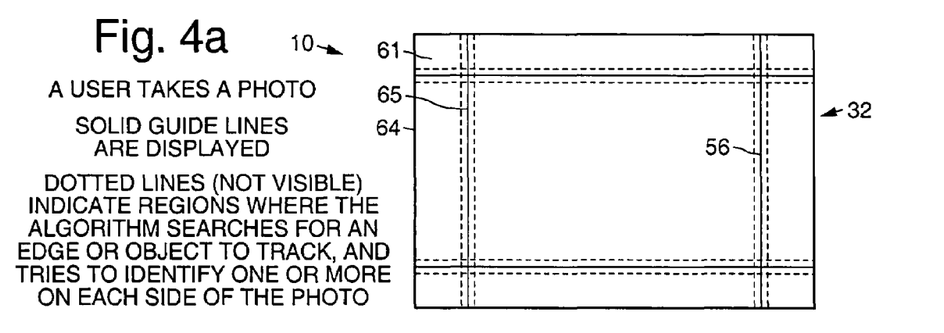
FIGS. 4a-4d illustrate a first embodiment of object tracking in accordance with the present invention.

Referring to FIG. 4a, only the area from the edge 64 of the image 61 to a line 65 of optimal overlap needs to be analyzed. The same thing happens on the opposite side of the image 61 (and also top and bottom) to create similar lines of best overlap. This essentially creates a rectangular frame around the sides of the image which can be tracked. The frame is tracked until it moves off of the screen 32 (as the user moves the camera 10 to the next image position). As long as one portion of the image is tracked, the system knows when the other parts of the frame should come back on-screen (if needed), because the relative locations are known.

As the user moves the camera 10 to the next image position, he or she will most likely move predominantly in one direction. This makes it reasonable to track only those portions of the frame that remain on-screen and it is not necessary to worry about the parts of that image that go off-screen (although key locations may be stored temporarily, so that if the tracked objects move such that these others would come back on-screen, the tracking could be re-started). Tracking multiple points-of-interest helps the algorithm 13 because the relative confidence can be higher with multiple confirmations of location (even if they aren't individually very strong).

Figure 4B:
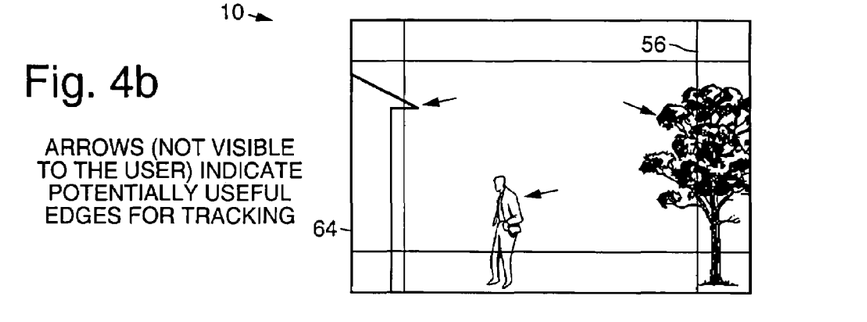

Referring to FIG. 4b, the analysis of the frame includes first moving an analysis window over this region and looking for candidate locations with identifying characteristics. These involves the edge-detection algorithm 13. The window may be various sizes, but a typical size might be 5 pixels by 5 lines. If for each of the four sides of the frame, one or more strong edge locations (indicated by the arrows in FIG. 4b overlaying the image) is found in the x and y directions, then those would serve as the key points for the tracking algorithm 13. The tree shown at the right side of the image is used in this example to align the subsequent image.

This edge profile is programmed into a convolution kernel and that kernel is continuously run over the region of the image near the original location of the edge. The definition of "near" depends upon the power of the processing circuitry 12 that performs the analysis, but it defines how much the image could move in-between image samples before the edge location is lost. The larger the radius of the neighborhood can be, the better the customer satisfaction as the positions will be retained more robustly.

The edge is recognized by finding the maximal response between the convolution kernel and a corresponding window portion of the image. The kernel would be continuously run over that region of the image each time a sample is taken by the camera and the edge location updated to the location where the convolution response was maximal. The algorithm 13 may also verify that the relative locations of the originally identified edges still remain consistent. This gives the algorithm 13 further confirmation that the edges identified are correct. Then this process is repeated until the user takes the next actual photo image, and then the algorithm 13 begins again with the new corresponding image "frame".

For performance reasons, this operation may be run on a low-resolution version of the image. Good accuracy may be achieved with a version of the image that is displayed on the display 32. This is typically much lower resolution than the actual photo that is taken.

Figure 4C:
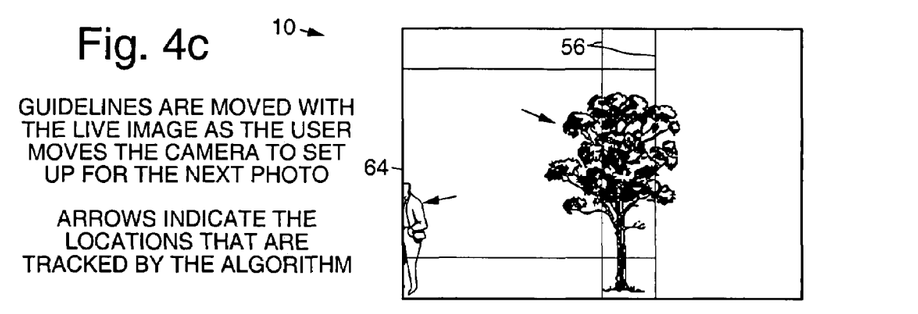
Figure 4D:
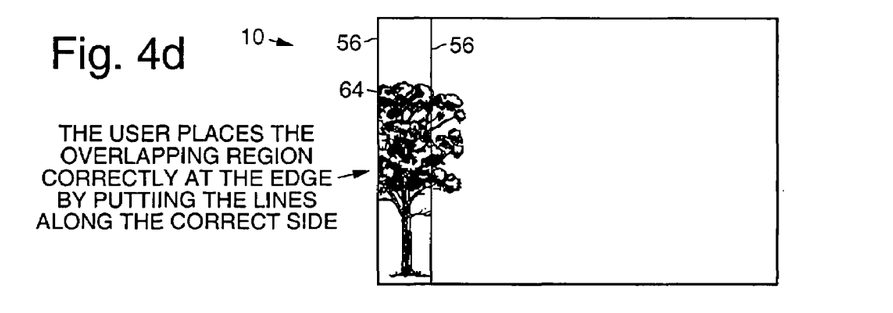

Referring to FIG. 4c, the user carefully rotates or pans the camera 10 (to the right) to move the image across the display 32 (to the left). The indicia 56 (guidelines or marks) move (to the left) along with the image (including the tree) until they are placed against the opposite (left) side of the display 32, as shown in FIG. 4d. This provides the user marks that permit very good alignment and placement of the subsequent photographic image relative to the first.

A stitching algorithm is employed to merge the photographic images together to produce the photographic image shown in FIG. 3c, for example. The present invention provides for improved matching of adjacent photographic images because of the matching overlapped portions of the adjacent images that were taken using the moveable marks 56. The moveable marks 56 provide sufficient overlap between the photographic images to accurately match features to create the desired panoramic or composite photograph.

Another exemplary user interface that may be provided by the present invention is as follows. This user interface provides a very intuitive way in which the user interacts with the panorama feature of the camera 10. This is illustrated with reference to FIGS. 5a-5c.

Figure 5A:
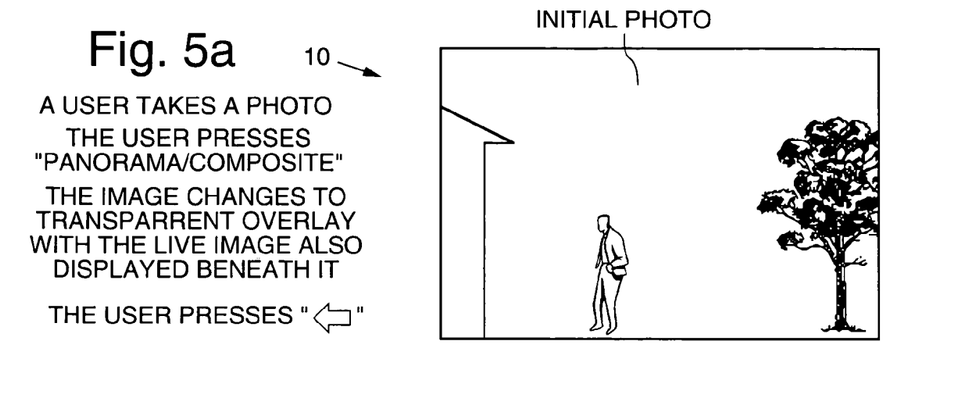
FIGS. 5a-5c illustrate a second embodiment of object tracking in accordance with the present invention.
Figure 5B:
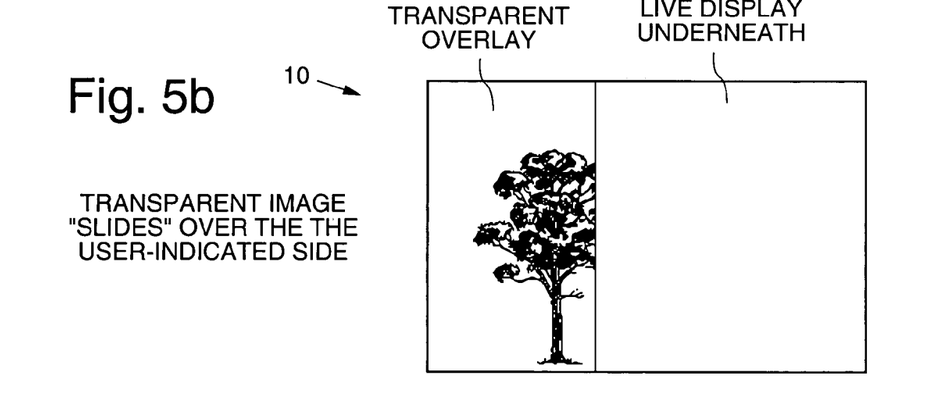
Figure 5C:
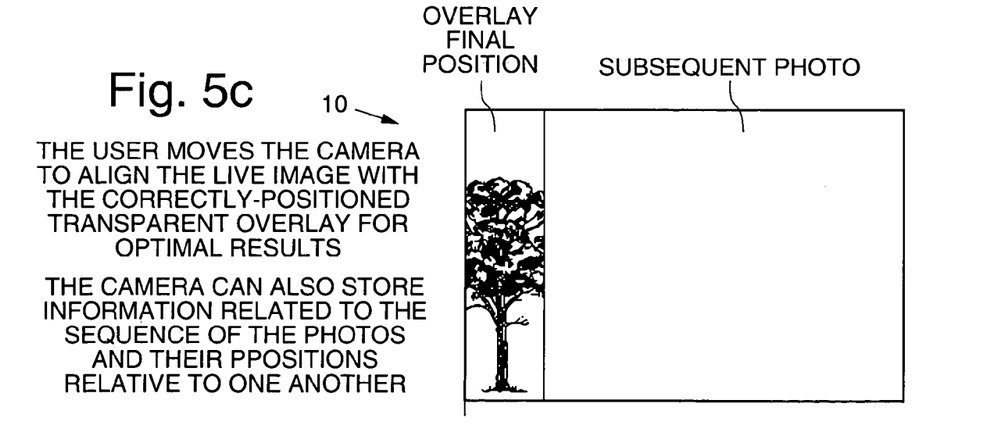

Referring to FIG. 5a, for example, in this embodiment, the user takes an initial photograph and views it on the display 32. Then, by pressing a button 36 (FIG. 2) to indicate "panorama" and then an arrow key (one of the buttons 36), the user indicates to the camera 10 that a composite photo is desired and shows which direction the next photo will be taken. The algorithm 13 responds, for example, by making the current image transparent (the transparent overlay shown in FIG. 5b), sliding it in the direction of the next picture (to the left in FIG. 5b). The current image is slid most of the way off of the display 32 as is shown in FIG. 5c, but is stopped leaving the proper amount of the image for the transparent overlay (as described above). The user then continues to use the arrow button 36 (FIG. 2) after each photo to indicate the direction that is desired. The algorithm 13 slides the overlays of the proper portion of each neighboring image as pictures are taken. At the end, the user presses the "panorama" button 36 again, for example, and the display 32 returns to normal nontransparent operation.

This additional animation and interface model combines to create an extremely intuitive interface for users to understand what they should do next. This technique also allows the camera 10 to perfectly understand what the user intends without requiring the user to plan out the entire composite photo in advance (which is very unlikely for most users).

This second aspect of the present invention works either in conjunction with the first or without it. If, for example, the user moves the camera 10 too much and the marks 56, or indicia 56, move off the display 32 or cannot be tracked fully within the image, then the second aspect can still display a (transparent or translucent) shadow copy 56 of the previous photographic image (illustrated in FIG. 3b as the area of the image bounded by the marks 56) and place the correct overlapping portion of it along the correct side of the live (live-view) image on the display 32. The user can then see when he or she has properly aligned the subsequent photographic image with the previous photographic image, because the transparent or translucent image 56 and the live image closely line up. In the other case, where both methods are on the display concurrently, the user can also align the object tracking marks up with the translucent copy region, further aiding them to get proper alignment between the sequential photos.

Alternatively, and in lieu of the (transparent or translucent) shadow copy 56, an outline of edges of certain objects in the picture may be a used.

If the second aspect is implemented such that the user interactively selects whether the next photographic image to be taken is to the top, right, left, or bottom of the previous photographic image, then the need to specify n and m (prior to beginning) can be eliminated. This is considered preferable, because the average user will probably not know exactly how many frames must be taken ahead of time.

The algorithm 13 running on the camera 10 remembers (or stores) where the previous photographic images have been taken and only gives the user those options that make sense. For example, if the photographic images have been proceeding from left to right, the user will be able to select top, right, or bottom, but not left (so previous photographic images do not get taken a second time). Once the second dimension has been selected (top or bottom), then the length of one of the dimensions is known from the number of frames taken in that direction.

The algorithm 13 running on the camera 10 continues giving directions for the user to take photographs in a zigzag fashion. Then, the algorithm 13 provides two indicia 56 (two sets of marks 56 or two shadow copies 56) from the two bordering images (except on images located at the edges of the final photograph) to guide the user's placement of the next photographic image relative to the marks 56 or shadow copies 56 on the display 32. This continues until the user indicates that he or she is done. This defines the other dimension. Large or high resolution composite images can easily be put together in this manner, guiding the user step-by-step through the process.

Later, the collection of images are stitched together in a traditional manner using currently available software, such as ImageAssembler, available from PanaVue, which may be used for one dimensional (panorama) or two-dimensional (composite) stitching. The only modification to some other software packages might be that additional options may be needed to understand that the final image has subimages in multiple dimensions rather than just one dimension.

Figure 6:
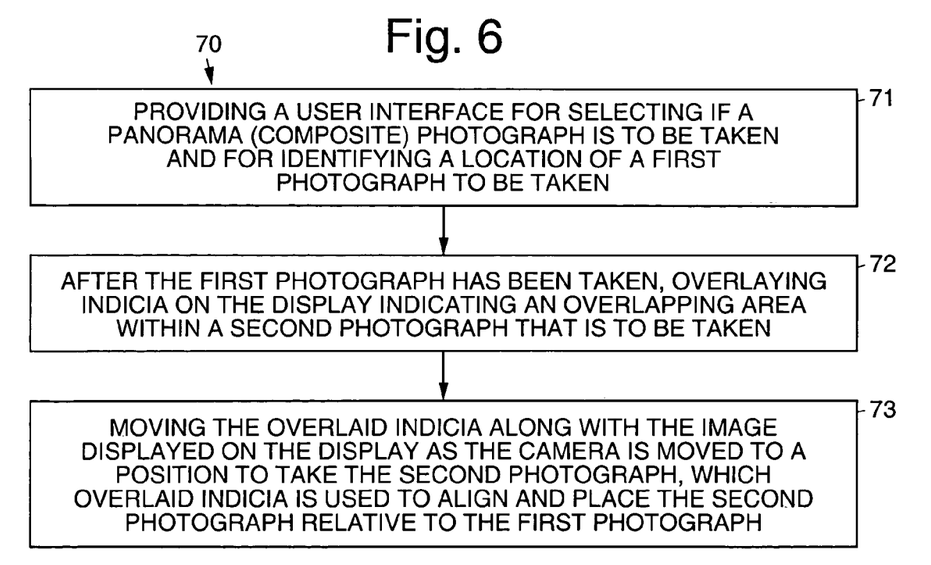
FIG. 6 is a flow diagram illustrating a first exemplary method in accordance with the principles of the present invention.

With the above in mind, FIG. 6 is a flow diagram illustrating a first exemplary method 70 in accordance with the principles of the present invention. The first exemplary method 70 comprises the following steps. The first exemplary method 70 is used with a digital camera 10 having a lens 41, an image sensor 11 for sensing an image viewed by the lens 41, a display 32 for displaying the image sensed by he image sensor 11, a storage device 14, 15 for storing the image sensed by the image sensor 11, and processing circuitry 12 coupled to the display 32, lens 41, image sensor 11, and storage device 14, 15.

The exemplary method 70 comprises the following steps. A user interface is displayed 71 on the display 32 for selecting if a panorama or composite photograph is to be taken and for identifying a location of a first photograph to be taken. After the first photograph has been taken, indicia is overlaid 72 on the display 32 indicating an overlapping area within a second photograph that is to be taken. The overlaid indicia is moved 73 along with the image displayed on the display 32 as the camera is moved to a position to take the second photograph. The overlaid indicia is used to align and place the second photograph relative to the first photograph.

Figure 7:
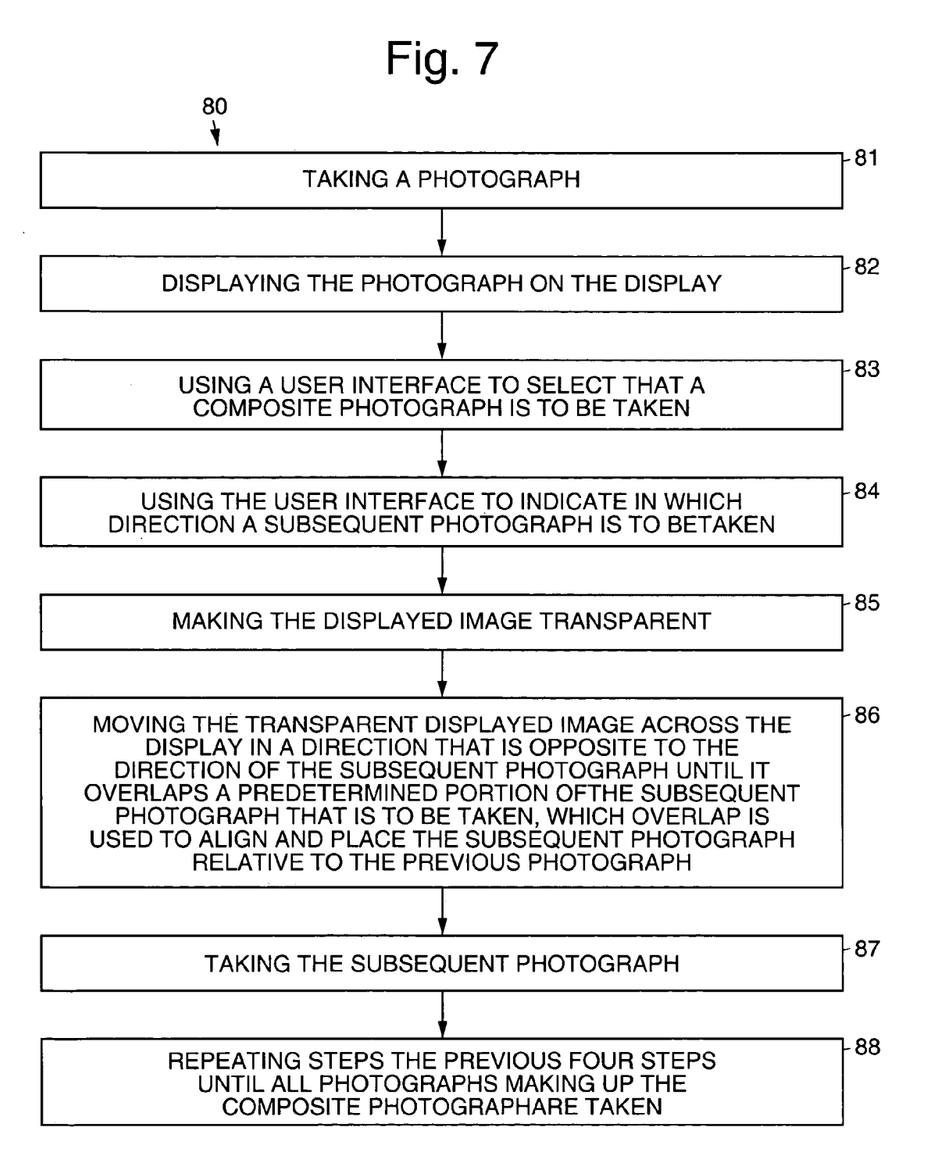
FIG. 7 is a flow diagram illustrating a second exemplary method in accordance with the principles of the present invention.

FIG. 7 illustrates a second exemplary method 80 in accordance with the principles of the present invention. The second exemplary method 80 is used with a digital camera 10 having a lens 41, an image sensor 11 for sensing an image viewed by the lens 41, a display 32 for displaying the image sensed by he image sensor 11, a storage device 14, 15 for storing the image sensed by the image sensor 11, and processing circuitry 12 coupled to the display 32, lens 41, image sensor 11, and storage device 14, 15. The second exemplary method 80 comprises the following steps.

A photograph is taken 81. The photograph is displayed 82 on the display. A user interface is used 83 to select that a composite photograph is to be taken. The user interface is used 84 to indicate in which direction a subsequent photograph is to be taken. The displayed image is made 85 transparent. The transparent displayed image is moved 86 across the display in a direction that is opposite to the direction of the subsequent photograph until it overlaps a predetermined portion of the subsequent photograph that is to be taken, which overlap is used to align and place the subsequent photograph relative to the photograph. The subsequent photograph is taken 87. The previous four steps (steps 84-87) are repeated 88 until all photographs making up the composite photograph are taken.

Advantages of the present invention are that it gives a user strong feedback about the relative alignment of their previous photographs with the current one that is to be taken. It makes it possible for average users to have success at creating complex composite photographs. It guides the user easily through the more complex composition process of creating composite photographs or more elaborate panoramas. It is much more accurate and user friendly way to interact with the user. The resulting panoramas and composite photographs will have higher quality and have more uniform results due to the improved alignment with one another.

Thus, digital cameras and methods that produce panorama (composite) images have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital camera system comprising:
a lens;
an image sensor for sensing an image viewed by the lens;
a display for displaying the image sensed by the image sensor;
a storage device for storing the image sensed by the image sensor;
processing circuitry coupled to the display, lens, image sensor, and storage device; and
a processing algorithm that runs on the processing circuitry that:

provides a user interface for selecting if a composite photograph is to be taken and for identifying a location of a first photograph to be taken;
after the first photograph has been taken, overlays indicia on the display indicating an overlapping area within a second photograph that is to be taken; and
uses video tracking to track the overlaid indicia that indicate the overlapping area within the second photograph as the overlaid indicia moves over the image displayed on the display as the camera is moved to a position to take the second photograph, which overlaid indicia is used to align and place the second photograph relative to the first photograph.

2. The system recited in claim 1 wherein the algorithm displays a user interface on the display for indicating the size of the desired composite photograph.

3. The system recited in claim 1 wherein the algorithm displays selection buttons on the display as part of the user interface to select if a composite photograph is to be taken.

4. The system recited in claim 1 wherein the algorithm displays a menu for indicating the size of the desired composite photograph.

5. The system recited in claim 1 wherein the indicia comprises a grid indicating the width and height of the desired composite photograph.

6. The system recited in claim 1 wherein the indicia comprises a shadow copy of the first photograph.

7. The system recited in claim 6 wherein the shadow copy comprises a transparent image.

8. The system recited in claim 6 wherein the shadow copy comprises a translucent image.

9. The system recited in claim 1 wherein the algorithm
stores the location of photographs that are taken; and
after the user selects a location of a subsequent photograph, displays indicia adjacent bordering images to guide the user's placement of the next photograph relative to the indicia on the display.

10. The system recited in claim 1 wherein the algorithm guides the user to take photographs in a zigzag fashion.

11. A method for use with a digital camera having a lens, an image sensor for sensing an image viewed by the lens, a display for displaying the image sensed by the image sensor, a storage device for storing the image sensed by the image sensor, and processing circuitry coupled to the display, lens, image sensor, and storage device, the method comprising the steps of:

providing a user interface for selecting if a composite photograph is to be taken and for identifying a location of a first photograph to be taken;
after the first photograph has been taken, overlaying indicia on the display indicating an overlapping area within a second photograph that is to be taken; and
using video object tracking to track the overlaid indicia that indicate the overlapping area within the second photograph as the overlaid indicia moves over the image displayed on the display as the camera is moved to a position to take the second photograph, which overlaid indicia is used to align and place the second photograph relative to the first photograph.

12. The method recited in claim 11 further comprising the step of:
displaying a user interface on the display for indicating the size of the desired composite photograph.

13. The method recited in claim 11 further comprising the step of:
displaying selection buttons on the display as part of the user interface to select if a composite photograph is to be taken.

14. The method recited in claim 11 wherein the further comprising the step of:
displaying a menu for indicating the size of the desired composite photograph.

15. The method recited in claim 11 wherein the indicia comprises a grid indicating the width and height of the desired composite photograph.

16. The method recited in claim 11 wherein the indicia comprises a shadow copy of the first photograph.

17. The method recited in claim 16 wherein the shadow copy comprises a transparent image.

18. The method recited in claim 16 wherein the shadow copy comprises a translucent image.

19. A method for use with a digital camera having a lens, an image sensor for sensing an image viewed by the lens, a display for displaying the image sensed by the image sensor, a storage device for storing the image sensed by the image sensor, a user interface, and processing circuitry coupled to the display, lens, image sensor, user interface and storage device, the method comprising the steps of:
(1) taking a photograph;
(2) displaying the photograph on the display;
(3) using a user interface to select that a composite photograph is to be taken;
(4) using the user interface to indicate in which direction a subsequent photograph is to be taken;
(5) making the displayed image transparent;
(6) using video object tracking to track the transparent displayed image as the transparent displayed image moves across the display in a direction that is opposite to the direction of the subsequent photograph until the transparent displayed image overlaps a predetermined portion of the subsequent photograph that is to be taken, which overlap is used to align and place the subsequent photograph relative to the photograph;
(7) taking the subsequent photograph; and
(8) repeating steps (4) through (7) until all photographs making up the composite photograph are taken.

20. The method recited in claim 19 further comprising the steps of:
using the user interface to select that the composite photograph is complete; and
returning the display to normal, nontransparent, operation.

21. A digital camera system comprising:
a lens;
image sensing means for sensing an image viewed by the lens;
display means for displaying the image sensed by the image sensor;
storage means for storing the image sensed by the image sensor; and
processing means coupled to the display, lens, image sensor, and storage device that embodies a processing algorithm that:
provides a user interface for selecting if a composite photograph is to be taken and for identifying a location of a first photograph to be taken;
after the first photograph has been taken, overlays indicia on the display indicating an overlapping area within a second photograph that is to be taken; and
uses video object tracking to track the overlaid indicia that indicate the overlapping area within the second photograph as the overlaid indicia moves over the image displayed on the display as the camera is moved to a position to take the second photograph, which overlaid indicia is used to align and place the second photograph relative to the first photograph.

* * * * *

UNITED STATES PATENT AND TRADEMARK OFFICE
CERTIFICATE OF CORRECTION

PATENT NO. : 7,656,429 B2 Page 1 of 1
APPLICATION NO. : 10/772165
DATED : February 2, 2010
INVENTOR(S) : Brad R. Larson It is certified that error appears in the above-identified patent and that said Letters Patent is hereby corrected as shown below:

In column 8, line 7, in Claim 1, delete "video tracking" and insert -- video object tracking --, therefor.

Signed and Sealed this

Thirteenth Day of July, 2010

David J. Kappos
*Director of the United States Patent and Trademark Office*